US009051985B2

(12) United States Patent
Murakami

(10) Patent No.: US 9,051,985 B2
(45) Date of Patent: Jun. 9, 2015

(54) HYDRAULIC SHOCK ABSORBER

(75) Inventor: Yosuki Murakami, Shizuoka (JP)

(73) Assignee: Showa Corporation, Saitama (JP)

( * ) Notice: Subject to any disclaimer, the term of this patent is extended or adjusted under 35 U.S.C. 154(b) by 108 days.

(21) Appl. No.: 13/406,349

(22) Filed: Feb. 27, 2012

(65) Prior Publication Data

US 2012/0152671 A1  Jun. 21, 2012

Related U.S. Application Data

(63) Continuation of application No. PCT/JP2010/065166, filed on Sep. 3, 2010.

(30) Foreign Application Priority Data

Feb. 25, 2010  (JP) ................. 2010-040951

(51) Int. Cl.
  *F16F 9/34* (2006.01)
  *F16F 9/00* (2006.01)
  *F16F 9/18* (2006.01)

(52) U.S. Cl.
  CPC ..................... *F16F 9/187* (2013.01)

(58) Field of Classification Search
  CPC ............. F16F 9/34; F16F 9/348; F16F 9/468; F16F 9/516; F16F 9/512; F16F 9/44; B60G 17/08
  USPC .......... 188/313–316, 322.13, 322.14, 322.21, 188/266
  See application file for complete search history.

(56) References Cited

U.S. PATENT DOCUMENTS

| 4,325,468 | A | * | 4/1982 | Siorek ........................ 188/282.8 |
| 4,561,524 | A | * | 12/1985 | Mizumukai et al. ....... 188/282.4 |
| 4,971,180 | A | * | 11/1990 | Kobayashi et al. ........ 188/282.4 |
| 5,246,092 | A | | 9/1993 | Yamaoka |
| 2008/0251331 | A1 | * | 10/2008 | Mangelschots et al. ... 188/266.6 |
| 2008/0257668 | A1 | * | 10/2008 | Yamaguchi et al. .......... 188/285 |

FOREIGN PATENT DOCUMENTS

| EP | 0322608 A2 | 7/1989 |
| JP | 06-221365 | 8/1994 |
| JP | 3462243 | 8/1994 |
| JP | 8-145107 | 6/1996 |
| JP | 8-277875 | 10/1996 |
| JP | 10-96441 | 4/1998 |
| JP | 2009-74562 | 4/2009 |
| JP | 2009133411 | * 6/2009 |

* cited by examiner

*Primary Examiner* — Vishal Sahni
(74) *Attorney, Agent, or Firm* — Keith Orum; Orum & Roth LLC

(57) ABSTRACT

In a hydraulic shock absorber 10 in which a piston rod 14 is inserted into an oil chamber 27 of a cylinder 13 provided in a damper case 11, and a damping force generating device 40 is provided between a piston side oil chamber 27A and a rod side oil chamber 27B of the cylinder 13, an outer flow path 13C communicating the piston side oil chamber 27A and the rod side oil chamber 27B is provided around the oil chamber 27 of the cylinder 13 in the damper case 11, and an oil reservoir chamber 32 is provided around the oil chamber 27 of the cylinder 13 in the damper case 11 and the outer flow path 13C.

11 Claims, 6 Drawing Sheets

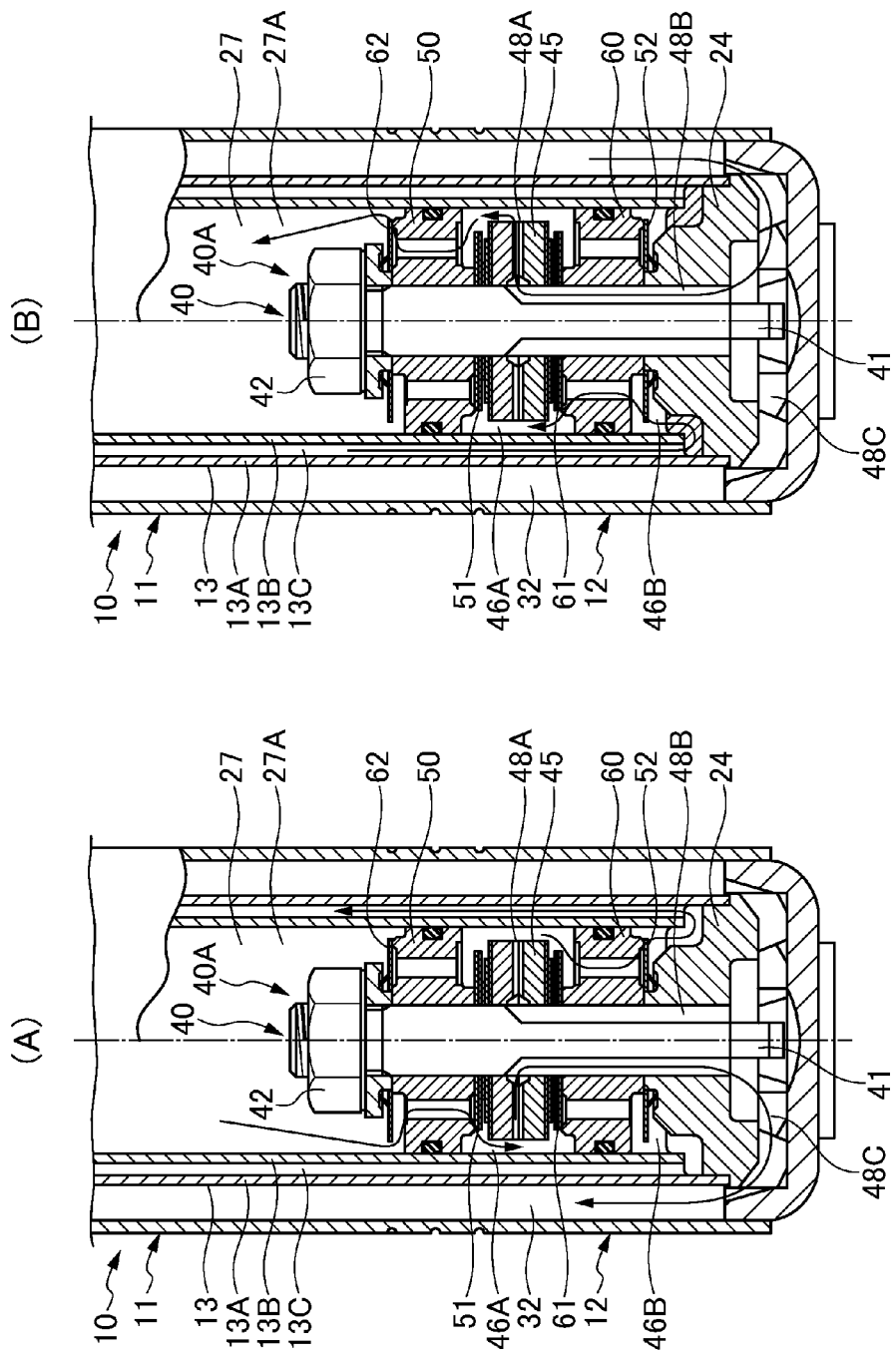

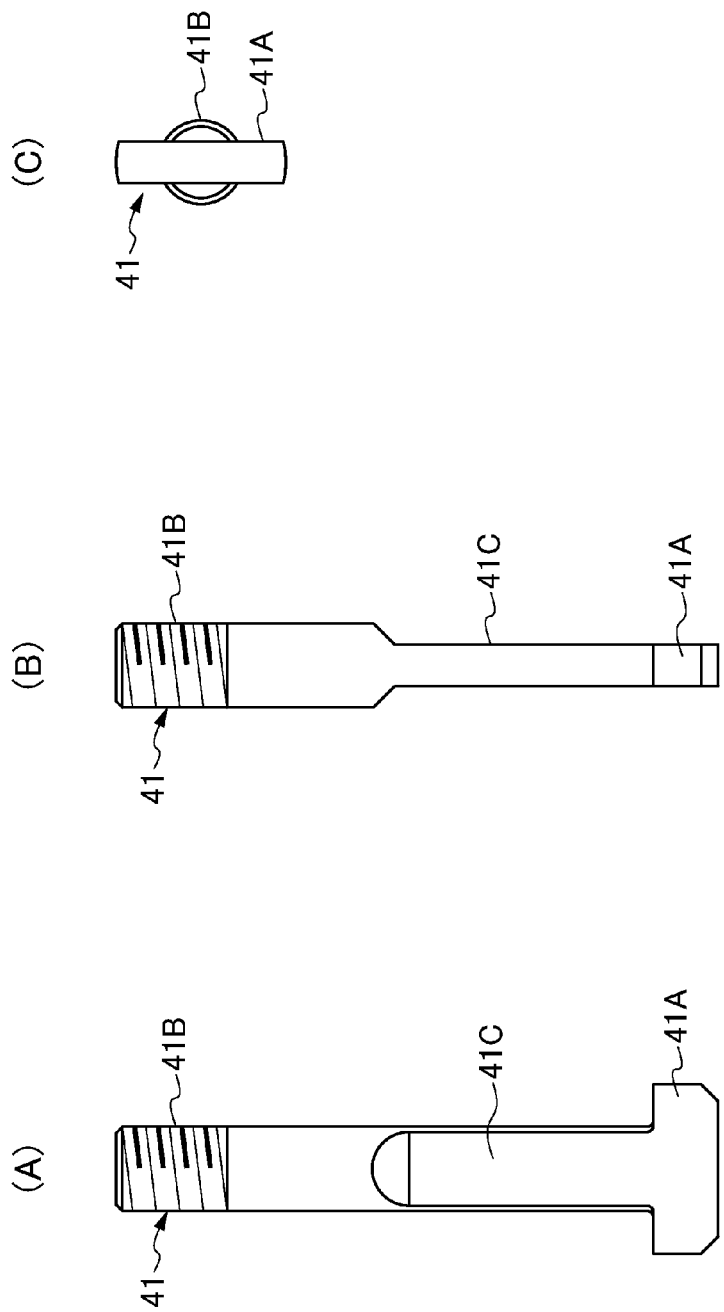

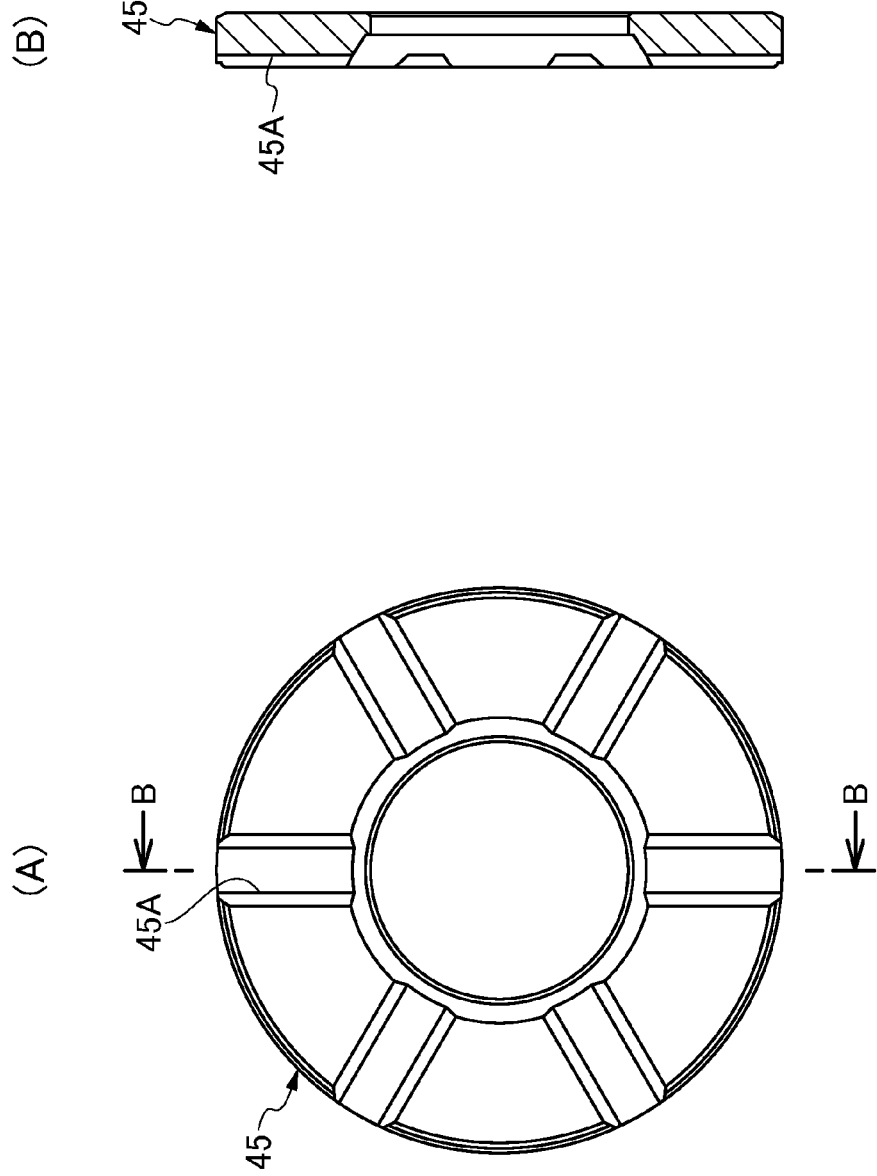

HYDRAULIC SHOCK ABSORBER

TECHNICAL FIELD

The present invention relates to a hydraulic shock absorber.

BACKGROUND ART

A hydraulic shock absorber described in Patent Document 1 is structured such that a piston rod attached to one of a vehicle body side and an axle side is inserted into an oil chamber of a cylinder included in a damper case attached to another of the vehicle body side and the axle side, the oil chamber of the cylinder is divided into a piston side oil chamber and a rod side oil chamber by a piston which is provided in a leading end portion of the piston rod, an oil reservoir chamber compensating a volumetric capacity of the piston rod going into and out of the oil chamber of the cylinder is communicated with the oil chamber of the cylinder, and a damping force generating device is provided between the piston side oil chamber and the rod side oil chamber of the cylinder.

PRIOR ART DOCUMENT

Patent Document

Patent Document 1: Japanese Patent No. 3462243

SUMMARY OF THE INVENTION

Problem to be Solved by the Invention

The hydraulic shock absorber described in Patent Document 1 is structured such that an accumulator constructing an oil reservoir chamber is formed by a separate body tank which is provided in an outer portion of the damper case. Accordingly, a hydraulic piping communicating the damper case and the separated body tank is necessary. Therefore, a whole of the hydraulic shock absorber consists of a combined body of the damper case and the separate body tank, and becomes complicated and large in size.

In this case, in the hydraulic shock absorber, in the case that the oil reservoir chamber is accessorily provided in one end side along an axial direction of the damper case, the damper case is elongated and enlarged in an axial direction, thereby obstructing a freedom on a layout in a vehicle on which this hydraulic shock absorber is mounted.

An object of the present invention is to additionally provide an oil chamber of a cylinder, an outer flow path and an oil reservoir chamber in an inner portion of a damper case having a short entire length, in a hydraulic shock absorber.

Means for Solving the Problem

In accordance with claim 1 of the present invention, there is provided a hydraulic shock absorber comprising: an oil chamber of a cylinder provided in a damper case which is attached to one of a vehicle body side and an axle side; a piston rod attached to another of the vehicle body side and the axle side, the piston rod being inserted into the oil chamber; a piston provided in a leading end portion of the piston rod, the oil chamber of the cylinder being divided into a piston side oil chamber and a rod side oil chamber by the piston; an oil reservoir chamber compensating a volumetric capacity of the piston rod which goes into and out of the oil chamber of the cylinder, the oil reservoir chamber being communicated with the oil chamber of the cylinder; and a damping force generating device provided between the piston side oil chamber and the rod side oil chamber of the cylinder. An outer flow path communicating between the piston side oil chamber and the rod side oil chamber is provided around the oil chamber of the cylinder in the damper case. The oil reservoir chamber is provided around the oil chamber and the outer flow path of the cylinder in the damper case.

In accordance with claim 2 of the present invention, in the invention in accordance with claim 1, wherein in the damper case the cylinder is inserted and fitted into an inner portion of a damper tube, the cylinder consists of an outer tube and an inner tube, the oil chamber is formed in an inner portion of the inner tube, the outer flow path is formed between the outer tube and the inner tube, and the oil reservoir chamber is formed between the damper tube and the outer tube.

In accordance with claim 3 of the present invention, in the invention in accordance with claim 1 or 2, wherein the damping force generating device is provided with a compression side flow path which circulates the oil in the piston side oil chamber of the cylinder toward the rod side oil chamber via the outer flow path of the cylinder in a compression side stroke, the compression side flow path is provided with a compression side damping valve in its upstream side and with a compression side check valve in its downstream side, and an intermediate portion of the compression side damping valve and the compression side check valve in the compression side flow path is communicated with the oil reservoir chamber. The damping force generating device is provided with an extension side flow path which circulates the oil in the rod side oil chamber of the cylinder toward the piston side oil chamber via the outer flow path of the cylinder in an extension side stroke, the extension side flow path is provided with an extension side damping valve in its upstream side and with an extension side check valve in its downstream side, and an intermediate portion of the extension side damping valve and the extension side check valve in the extension side flow path is communicated with the oil reservoir chamber.

In accordance with claim 4 of the present invention, in the invention in accordance with claim 3, wherein the damping force generating device is accessorily provided with a compression side damping force generating means in the compression side check valve provided in the downstream side of the compression side flow path.

In accordance with claim 5 of the present invention, in the invention in accordance with claim 3 or 4, wherein the damping force generating device is accessorily provided with an extension side damping force generating means in the extension side check valve provided in the downstream side of the extension side flow path.

In accordance with claim 6 of the present invention, in the invention in accordance with any one of claims 3 to 5, wherein the damping force generating device has a valve piece which is immobilized to the cylinder, a center plate is provided in an outer periphery of the valve piece at the center along an axial direction of the valve piece, and the compression side damping valve and the extension side check valve are provided on one side in the axial direction pinching the center plate in the outer periphery of the valve piece, the extension side damping valve and the compression side check valve are provided in another side, and a set of the compression side damping valve and the extension side check valve and a set of the extension side damping valve and the compression side check valve are arranged so as to be line symmetrical across the center plate.

In accordance with claim 7 of the present invention, in the invention in accordance with claim 6, wherein the damping force generating device is structured such that the valve piece is immobilized at a center axis of the cylinder in one end side within the piston side oil chamber of the cylinder, and the compression side flow path and the extension side flow path are provided in the periphery of the center plate, and the compression side flow path and the extension side flow path are communicated with the oil reservoir chamber via a communication path which is provided in the center plate and a communication path which is provided in the valve piece.

In accordance with claim 8 of the present invention, in the invention in accordance with claim 6 or 7, wherein the damping force generating device is structured such that a hollow portion provided along the center axis of the valve piece is provided with a bypass flow path which communicates the piston side oil chamber of the cylinder with the rod side oil chamber and the oil reservoir chamber while bypassing the compression side damping valve and the extension side damping valve, and a damping force regulating valve which is operated from the outside is provided in this bypass flow path.

In accordance with claim 9 of the present invention, in the invention in accordance with claim 2, wherein the damper case is formed as a triple tube in which the damper tube, and the outer tube and the inner tube of the cylinder are coaxially arranged.

Effects (Claim 1)

(a) In the hydraulic shock absorber, the outer flow path communicating the piston side oil chamber and the rod side oil chamber is provided in the periphery of the oil chamber of the cylinder in the damper case, and the oil reservoir chamber is provided in the periphery of the oil chamber and the outer flow path of the cylinder in the damper case. Accordingly, the oil chamber is provided in the center portion of the cylinder in the damper case, the outer flow path is provided in the outer side of the oil chamber, and the oil reservoir chamber is provided further in the outer side of the outer flow path. Therefore, in the hydraulic shock absorber, the oil chamber of the cylinder, the outer flow path and the oil reservoir chamber can be together provided in the inner portion of the damper case having the short entire length, without elongating and enlarging the damper case, and it is possible to improve the freedom on the layout in the vehicle on which this hydraulic shock absorber is mounted.

(Claims 2 and 9)

(b) In the damper case, the cylinder is inserted and fitted into the inner portion of the damper tube, the cylinder consists of the outer tube and the inner tube, the oil chamber is formed in the inner portion of the inner tube, the outer flow path is formed between the outer tube and the inner tube, and the oil reservoir chamber is formed between the damper tube and the outer tube. Due to the triple tube structure consisting of the damper tube, and the outer tube and the inner tube of the cylinder, it is possible to achieve the item (a) mentioned above compactly.

(Claim 3)

(c) In the hydraulic shock absorber, the damping force generating device is provided between the piston side oil chamber of the cylinder, and the rod side oil chamber, the damping force generating device is provided with the compression side flow path which circulates the oil in the piston side oil chamber of the cylinder toward the rod side oil chamber via the outer flow path of the cylinder in the compression side stroke, the compression side flow path is provided with the compression side damping valve in its upstream side and with the compression side check valve in its downstream side, the intermediate portion of the compression side damping valve and the compression side check valve in the compression side flow path is communicated with the oil reservoir chamber, the damping fore generating device is provided with the extension side flow path which circulates the oil in the rod side oil chamber of the cylinder toward the piston side oil chamber via the outer flow path of the cylinder in the extension side stroke, the extension side flow path is provided with the extension side damping valve in its upstream side and with the extension side check valve in its downstream side, and the intermediate portion of the extension side damping valve and the extension side check valve in the extension side flow path is communicated with the oil reservoir chamber.

In the compression side stroke, the boosted oil in the piston side oil chamber passes through the compression side damping valve in the upstream side of the compression side flow path of the damping force generating device so as to generate the compression side damping force. One oil flow in the oil flowing out of the compression side damping valve flows into the rod side oil chamber from the compression side check valve through the outer flow path of the cylinder. Further, the oil flow at a forward moving volumetric capacity of the piston rod which corresponds to another oil flow in the oil flowing out of the compression side damping valve flows into the oil reservoir chamber. At this time, the pressure in the rod side oil chamber approximately depends only on the pressure of the air chamber (since the flow path resistance between the compression side check valve in the downstream side of the compression side damping valve and the outer flow path of the cylinder is small), and does not fluctuate by the setting of the flow path resistance of the compression side damping valve. Accordingly, it is possible to avoid a pause of the damping force at a time of the extension side reverse.

In the extension side stroke, the boosted oil in the rod side oil chamber passes through the extension side damping valve in the upstream side of the extension side flow path of the damping force generating device from the outer flow path of the cylinder so as to generate the extension side damping force. The oil flowing out of the extension side damping valve is mixed with the oil at the backward moving volumetric capacity of the piston rod which is replenished from the oil reservoir chamber, and thereafter flows into the piston side oil chamber through the extension side check valve.

In this case, it is possible to set the pressure in the rod side oil chamber to the great positive pressure in the compression side stroke so as to improve a damping response at a time of the extension side reverse, by setting the pressure in the air chamber pressurizing the oil reservoir chamber to the high pressure.

(Claim 4)

(d) The damping force generating device in the item (c) mentioned above is accessorily provided with the compression side damping force generating means in the compression side check valve provided in the downstream side of the compression side flow path, and the compression side check valve is constructed, for example, by the compression side laminated disc valve. At this time, in the compression side stroke, one oil flow in the oil flowing out of the compression side damping valve in the upstream side flows into the rod side oil chamber from the compression side laminated disc valve through the outer flow path of the cylinder; however, the compression side laminated disc valve achieves the compression side damping force generating function as well as the check function. The compression side laminated disc valve generates a damping force $\Delta F$ which depends on the piston speed, and a pressure Pr in the rod side oil chamber comes to a value obtained by subtracting $\Delta F$ from a pressure Pa in the air chamber pressurizing the oil reservoir chamber, that is, a value which is controlled depending on the piston speed.

The pressure Pr of the rod side oil chamber being controlled depending on the piston speed in the compression side stroke as mentioned above means that it is possible to control a rising characteristic of the damping force at a time of the extension side reverse depending on the piston speed. When the piston speed is high, $\Delta F$ becomes larger by a throttling of the compression side laminated disc valve, and Pr becomes smaller. Accordingly, the rising edge of the damping force at a time of the extension side reverse becomes slow so as to improve a ride quality. When the piston speed is low, $\Delta F$ by the throttling of the compression side laminated disc valve becomes smaller, and Pr becomes larger. Accordingly, the rising edge of the damping force at a time of the extension side reverse becomes sharp so as to suppress a wobbling feeling of the vehicle body and improve a driving stability.

At this time, a total amount of the compression side damping force comes to a summation of the damping force of the compression side damping valve and the damping force of the compression side laminated disc valve; however, the damping force of the compression side damping valve is made larger in a normal setting. The total amount of the compression side damping force approximately depends on the damping force of the compression side damping valve.

(Claim 5)

(e) The damping force generating device in the item (c) mentioned above is accessorily provided with the extension side damping force generating means in the extension side check valve provided in the downstream side of the extension side flow path, and the extension side check valve is constructed, for example, by the extension side laminated disc valve. At this time, in the extension side stroke, one oil flow in the oil flowing out of the extension side damping valve in the upstream side flows into the piston side oil chamber from the extension side laminated disc valve through the outer flow path of the cylinder; however, the extension side laminated disc valve achieves the extension side damping force generating function as well as the check function. The extension side laminated disc valve generates the damping force $\Delta F$ which depends on the piston speed, and a pressure Pp in the piston side oil chamber comes to a value obtained by subtracting $\Delta F$ from the pressure Pa in the air chamber pressurizing the oil reservoir chamber, that is, a value which is controlled depending on the piston speed.

The pressure Pp of the piston side oil chamber being controlled depending on the piston speed in the extension side stroke as mentioned above means that it is possible to control a rising characteristic of the damping force at a time of the compression side reverse depending on the piston speed. When the piston speed is high, $\Delta F$ becomes larger by a throttling of the extension side laminated disc valve, and Pp becomes smaller. Accordingly, the rising edge of the damping force at a time of the compression side reverse becomes slow so as to improve a ride quality. When the piston speed is low, $\Delta F$ by the throttling of the extension side laminated disc valve becomes smaller, and Pp becomes larger. Accordingly, the rising edge of the damping force at a time of the compression side reverse becomes sharp so as to suppress a wobbling feeling of the vehicle body and improve a driving stability.

At this time, a total amount of the extension side damping force comes to a summation of the damping force of the extension side damping valve and the damping force of the extension side laminated disc valve; however, the damping force of the extension side damping valve is made larger in a normal setting. The total amount of the extension side damping force approximately depends on the damping force of the extension side damping valve.

(Claim 6)

(f) The damping force generating device in the items (c) to (e) mentioned above has a valve piece which is immobilized to the cylinder, the center plate is provided in an outer periphery of the valve piece at the center along the axial direction of the valve piece, the compression side damping valve and the extension side check valve are provided on one side in the axial direction pinching the center plate in the outer periphery of the valve piece, the extension side damping valve and the compression side check valve are provided in another side, and the set of the compression side damping valve and the extension side check valve and the set of the extension side damping valve and the compression side check valve are arranged so as to be line symmetrical across the center plate. In accordance with this, it is possible to set both the flow path of the oil in the item (a) mentioned above which flows out of the rod side oil chamber and the oil reservoir chamber from the piston side oil chamber through the damping force generating device in the compression side stroke, and the flow path of the oil in the item (a) mentioned above which flows out to the piston side oil chamber from the rod side oil chamber and the oil reservoir chamber through the damping force generating device in the extension side stroke to the short flow path lengths and the small flow path resistances, and it is possible to make the oil flows smooth.

(Claim 7)

(g) The damping force generating device in the item (f) mentioned above is structured such that the valve piece is immobilized at the center axis of the cylinder in one end side within the piston side oil chamber of the cylinder, the compression side flow path and the extension side flow path are provided in the periphery of the center plate, and the compression side flow path and the extension side flow path are communicated with the oil reservoir chamber via the communication path which is perforated in the center plate and the communication path which is perforated in the valve piece. In accordance with this, it is possible to make the route which communicates the intermediate portion of the compression side flow path and the extension side flow path of the damping force generating device with the oil reservoir chamber compact so as to make the flow of the oil in the route smooth.

(Claim 8)

(h) The damping force generating device in the item (f) or the item (g) mentioned above is structured such that the hollow portion provided along the center axis of the valve piece is provided with the bypass flow path which communicates the piston side oil chamber of the cylinder with the rod side oil chamber and the oil reservoir chamber while bypassing the compression side damping valve and the extension side damping valve, and the damping force regulating valve which is operated from the outside is provided in this bypass flow path. In accordance with this, it is possible to regulate the magnitude of the compression side damping force and/or the extension side damping force by using the damping force generating device.

BRIEF DESCRIPTION OF THE DRAWINGS

FIGS. 4(A) and 4(B) are cross sectional views showing a flow of an oil in a damping force generating device, in which FIG. 4(A) shows a compression side stroke, and FIG. 4(B) shows an extension side stroke.

FIGS. 5(A), 5(B) and 5(C) show a valve piece, in which FIG. 5(A) is a front elevational view, FIG. 5(B) is a side elevational view and FIG. 5(C) is a plan view.

FIGS. 6(A) and 6(B) show a center plate, in which FIG. 6(A) is a plan view and FIG. 6(B) is a cross sectional view along a line B-B in FIG. 6(A).

BEST MODE FOR CARRYING OUT THE INVENTION

Figure 1:
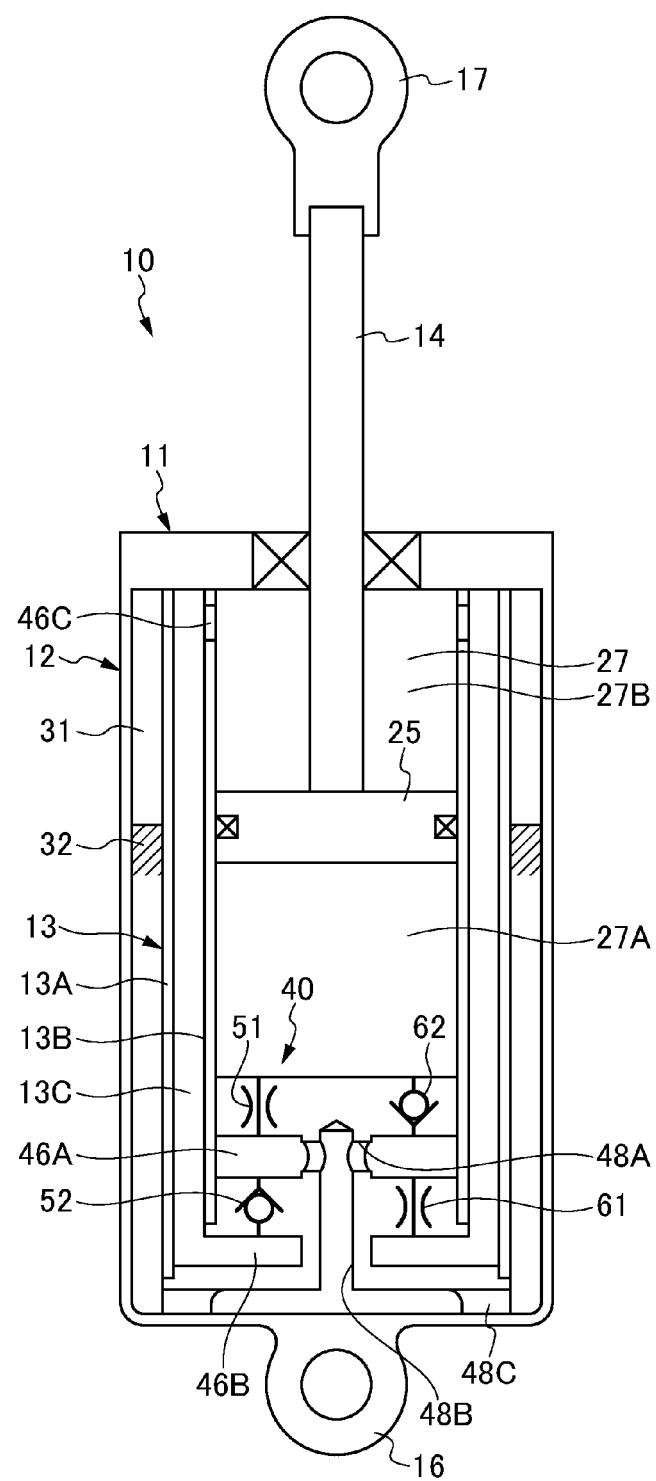
FIG. 1 is a schematic cross sectional view showing a basic structure of a hydraulic shock absorber.
Figure 2:
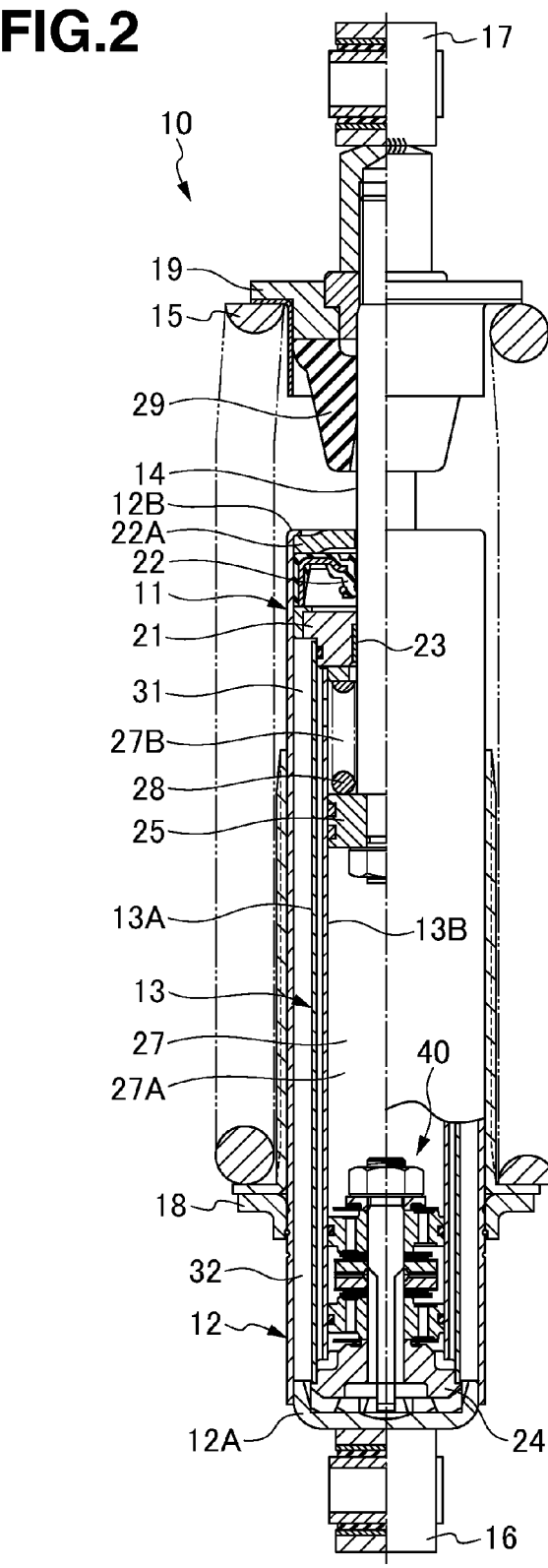
FIG. 2 is a cross sectional view showing the hydraulic shock absorber.
Figure 3:
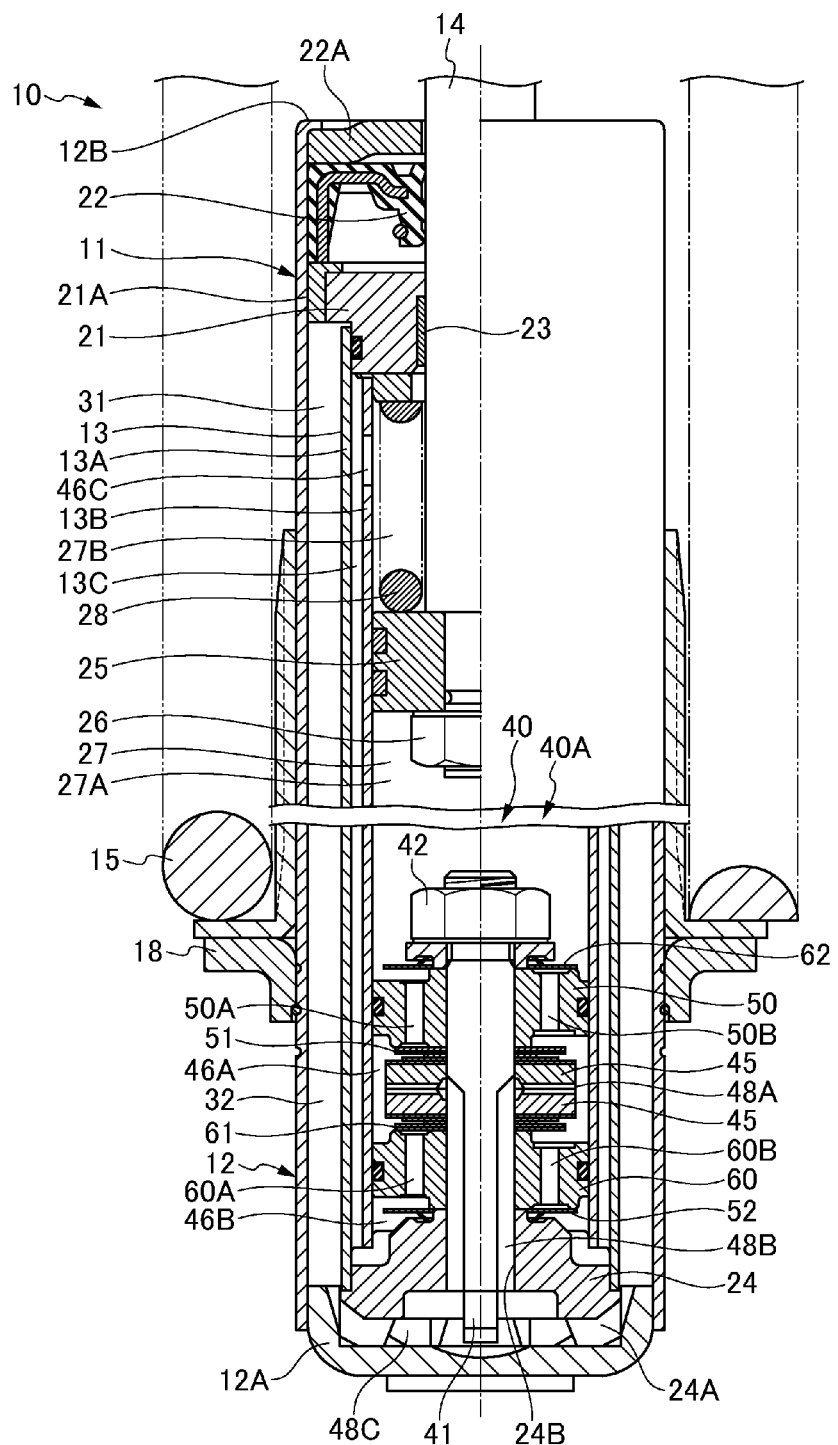
FIG. 3 is a cross sectional view showing a damper case.

A hydraulic shock absorber 10 is structured, as shown in FIGS. 1 to 3, such that a damper case 11 attached to an axle side has a damper tube 12, and a damper cylinder 13 is inserted into and fitted to an inner portion of the damper tube 12. Further, the hydraulic shock absorber 10 is structured such that a piston rod 14 attached to a vehicle body side is slidably inserted into center portions of the damper tube 12 of the damper case 11 and the cylinder 13, and a suspension spring 15 is interposed to outer portions of the damper case 11 and the piston rod 14.

The damper case 11 is provided with an axle side attaching member 16 in a center portion of an outer surface of a bottom cap 12A of the damper tube 12, and the piston rod 14 is provided with a vehicle body side attaching member 17. A spring receiver 18 is provided in an outer peripheral portion of the damper tube 12 in the damper case 11, and a spring receiver 19 is provided in an outer peripheral portion of the vehicle body side attaching member 17 in the piston rod 14. The suspension spring 15 is interposed between the spring receiver 18 and the spring receiver 19, and absorbs a shock force which a vehicle receives from a road surface on the basis of a spring force of the suspension spring 15.

The damper tube 12 of the damper case 11 is provided in its opening portion with a rod guide 21 through which the piston rod 14 passes. The rod guide 21 is structured such that a head portion 21A is inserted into and attached in a liquid tight manner to the damper tube 12, and the piston rod 14 is slidably inserted in a liquid tight manner into an inner diameter portion provided with an oil seal 22 and a bush 23.

In the hydraulic shock absorber 10, the damper case 11 is structured such that the cylinder 13 is inserted into and fitted to the inner portion of the damper tube 12, the cylinder 13 consists of an outer tube 13A and an inner tube 13B, and the damper case 11 is structured such that a lower end inner periphery of the damper tube 12 is fitted to an outer periphery of the bottom cap 12A so as to be fixed by welding or the like. Leg portions 24A provided at a plurality of positions in a lower end of an outer periphery of a bottom piece 24 are arranged so as to be centered on a cup-shaped inner bottom surface of the bottom cap 12A, and respective lower end inner peripheries of the outer tube 13A and the inner tube 13B of the cylinder 13 are fixed by press fit or the like to a large outer diameter portion and a small outer diameter portion which are provided on the leg portions 24A in an outer periphery of the bottom piece 24. On the other hand, respective upper end inner peripheries of the outer tube 13A and the inner tube 13B of the cylinder 13 are fixed by press fit or the like to a large outer diameter portion and a small outer diameter portion which are provided below the head portion 21A of the rod guide 21. An upper end inner periphery of the outer tube 13A is inserted into and attached in a liquid tight manner to an O-ring which is loaded to the large outer diameter portion of the rod guide 21. Further, the head portion 21A of the rod guide 21 is inserted into and attached to the damper tube 12, which protrudes above an oil seal 22 on the head portion 21A and a washer 22A which is provided on an upper surface of the oil seal 22, and sets the protruding end as a caulking portion 12B. The damper tube 12 is structured so as to pinch and fix the outer tube 13A and the inner tube 13B of the cylinder 13 in an axial direction between the bottom cap 12A and the caulking portion 12B via the rod guide 21, the oil seal 22, the washer 22A and the bottom piece 24.

In the hydraulic shock absorber 10, in accordance with the above, a whole of the damper case 11 is formed as a triple tube in which the damper tube 12, and the outer tube 13A and the inner tube 13B of the cylinder 13 are coaxially arranged. Further, an oil chamber 27 consisting of a piston side oil chamber 27A and a rod side oil chamber 27B is formed in an inner portion of the inner tube 13B, an outer flow path 13C communicating the piston side oil chamber 27A and the rod side oil chamber 27B is formed by an annular gap between the outer tube 13A and the inner tube 13B, and an annular gap between the damper tube 12 and the outer tube 13A is formed as an air chamber 31 and an oil reservoir chamber 32.

In other words, in the hydraulic shock absorber 10, when the piston rod 14 is inserted into the center portions of the damper tube 12 of the damper case 11 and the cylinder 13, a piston 25 inserted into and attached to a leading end portion of the piston rod 14 is fixed by a nut 26, and an oil chamber 27 of the cylinder 13 is divided into a piston side oil chamber 27A and a rod side oil chamber 27B by the piston 25 which is slidably inserted into an inner periphery of the inner tube 13B. Reference numeral 28 denotes a rebound spring, and reference numeral 29 denotes a bump rubber.

Further, in the hydraulic shock absorber 10, the air chamber 31 and the oil reservoir chamber 32 are respectively provided in upper and lower sides of an annular gap between the damper tube 12 and the outer tube 13A, the oil reservoir chamber 32 is provided in such a manner as to be communicated with the oil chamber 27 of the cylinder 13, and the oil reservoir chamber 32 compensates a volumetric capacity (including a volumetric capacity of a temperature expanding amount of the oil) of the piston rod 14 which goes into and out of the oil chamber 27 of the cylinder 13.

The hydraulic shock absorber 10 is provided with a damping force generating device 40 between the piston side oil chamber 27A and the rod side oil chamber 27B of the cylinder 13.

The damping force generating device 40 is inserted into a lower end inner periphery of the inner tube 13B of the cylinder 13 so as to be embedded in a state of a valve unit 40A which is sub assembled in an upper surface in an opposite side to the leg portion 24A of the bottom piece 24.

The valve unit 40A of the damping force generating device 40 has a bolt-shaped valve piece 41 (FIG. 5) which is inserted into a hole 24B perforated on a center axis of the bottom piece 24 from a lower surface of the bottom piece 24. The valve piece 41 is structured such that a flat-shaped head portion 41A provided in a lower end portion is locked around the hole 24B in the lower surface of the bottom piece 24, and a nut 42 is threadably attached to a rod-shaped thread portion 41B. Further, a half portion in a longitudinal direction of the head portion 41A side in an axial direction of the valve piece 41 is formed as a flat plate portion 41C formed such that both surfaces are chipped off, an outer periphery of the flat plate portion 41C is provided with two opposed center plates 45 (FIG. 6), a compression side check valve 52, an extension side piston 60 and an extension side damping valve 61 are loaded in this order from the side of the bottom piece 24 in an axial direction pinching the center plate 45 in an outer periphery of the valve piece 41, and an extension side check valve 62, a compression side piston 50 and a compression side damping valve 51 are loaded in this order from the side of the nut 42. A set of the compression side check valve 52, the extension side piston 60 and the extension side damping valve 61, and a set of the extension side check valve 62, the compression side piston 50 and the compression side damping valve 51 are arranged so as to be line symmetrical across the center plate 45, and are pinched and immobilized together with the center plate 45 between the upper surface of the bottom piece 24 to which the head portion 41A of the valve piece 41 is locked, and the nut 42 which is threadably attached to the thread portion 41B of the valve piece 41.

The valve unit 40A of the damping force generating device 40 is inserted into the inner tube 13B of the cylinder 13, and is structured such that the outer peripheries of the compression side piston 50 and the extension side piston 60 are fixed in a liquid tight manner to the inner periphery of the inner tube 13B, the space in the opposite side to the extension side piston of the compression piston 50 in the inner portion of the inner tube 13B is set to the piston side oil chamber 27A, and the space in the opposite side to the compression side piston of the extension side piston 60 in the inner portion of the inner tube 13B is set to an extension and compression common flow path 46B which is communicated with the rod side oil chamber 27B via the outer flow path 13C between the outer tube 13A and the inner tube 13B of the cylinder 13. In this case, a groove flow path which serves as a part of the extension and compression common flow path 46B is formed in a notched manner in the periphery of the small outer diameter portion to which the inner tube 13B is fixed in the bottom piece 24. An upper end side of the inner tube 13B is provided in a perforating manner with an extension and compression common flow path 46C which communicates the rod side oil chamber 27B with the outer flow path 13C. An annular space which is pinched between the compression side piston 50 and the extension side piston 60 in the periphery of the center plate 45 in the inner portion of the inner tube 13B is set to an extension and compression common flow path 46A. The extension and compression common flow path 46A is communicated with a hole-like extension and compression common flow path 48A (a communication path) which two opposed center plates 45 forms by facing a plurality of radial grooves 45A (FIG. 6) provided in a radial shape in their mating faces of the perforated plates to each other. The extension and compression common flow path 48A formed by the center plate 45 is communicated with an extension and compression common flow path 48B (a communication path) which the flat plate portion 41C of the valve piece 41 forms with respect to the center plate 45, the extension side piston 60, and each of the center holes of the bottom piece 24. The extension and compression common flow path 48B is communicated with the oil reservoir chamber 32 between the damper tube 12 and the outer tube 13A of the cylinder 13 via an extension and compression common flow path 48C (a communication path) which the lower surface of the bottom piece 24 forms with respect to the bottom cap 12A.

Further, the damping force generating device 40 is provided in the compression side piston 50 with a compression side flow path 50A which is opened and closed by the compression side damping valve 51, and an extension side flow path 50B which is opened and closed by the extension side check valve 62, and is provided in the extension side piston 60 with a compression side flow path 60B which is opened and closed by the compression side check valve 52, and an extension side flow path 60A which is opened and closed by the extension side damping valve 61. The damping force generating device 40 communicates the piston side oil chamber 27A and the rod side oil chamber 27B of the cylinder 13 via the extension and compression common flow paths 46A and 46B, the compression side flow path 50A and the extension side flow path 50B which are provided in the compression side piston 50, the compression side flow path 60B and the extension side flow path 60A which are provided in the extension side piston 60, and the outer flow path 13C which is provided in an annular gap of the outer tube 13A and the inner tube 13B of the cylinder 13 (the piston 25 is not provided with a flow path which communicates the piston side oil chamber 27A and the rod side oil chamber 27B).

Accordingly, in the hydraulic shock absorber 10, the damping force generating device 40 is provided with the compression side flow paths (the extension and compression common flow paths 46A and 46B, and the compression side flow paths 50A and 60B) which circulate the oil in the piston side oil chamber 27A of the cylinder 13 from the outer flow path 13C of the cylinder 13 toward the rod side oil chamber 27B, in the compression side stroke, the compression side damping valve 51 is provided in an upstream side of the compression side flow paths (the extension and compression common flow paths 46A and 46B, and the compression side flow paths 50A and 60B), the compression side check valve 52 is provided in a downstream side thereof, and an intermediate portion of the compression side damping valve 51 and the compression side check valve 52 in the compression side flow paths (the extension and compression common flow paths 46A and 46B, and the compression side flow paths 50A and 60B) is communicated with the oil reservoir chamber 32 via the extension and compression common flow paths 46A, and 48A to 48C.

Further, the damping force generating device 40 is provided with the extension side flow paths (the extension and compression common flow paths 46A and 46B, and the extension side flow paths 50B and 60A) which circulate the oil in the rod side oil chamber 27B of the cylinder 13 from the outer flow path 13C of the cylinder 13 toward the piston side oil chamber 27A, in the extension side stroke, the extension side damping valve 61 is provided in an upstream side of the extension side flow paths (the extension and compression common flow paths 46A and 46B, and the extension side flow paths 50B and 60A), the extension side check valve 62 is provided in a downstream side thereof, and an intermediate portion of the extension side damping valve 61 and the extension side check valve 62 in the extension side flow paths (the extension and compression common flow paths 46A and 46B, and the extension side flow paths 50B and 60A) is communicated with the oil reservoir chamber 32 via the extension side common flow paths 46A, and 48A to 48C.

Accordingly, the hydraulic shock absorber 10 carries out a damping action in the following manner.

(Compression Side Stroke) (Flow of Solid Arrow in FIG. 4(A))

The oil in the piston side oil chamber 27A is boosted, and pushes open the compression side damping valve 51 in the compression side flow path 50A of the compression side piston 50 of the damping force generating device 40 so as to generate the compression side damping force. The oil flowing out of the compression side damping valve 51 to the extension and compression common flow path 46A is separated into two in the extension and compression common flow path 46A, one oil flows out to the rod side oil chamber 27B from the compression side check valve 52 in the compression side flow path 60B of the extension side piston 60 through the outer flow path 13C of the cylinder 13, and another oil is discharged to the oil reservoir chamber 32. The another oil discharged to the oil reservoir chamber 32 compensates the oil at a forward moving volumetric capacity of the piston rod 14.

(Extension Side Stroke) (Flow of Solid Arrow in FIG. 4(B))

The oil in the rod side oil chamber 27B is boosted, and pushes open the extension side damping valve 61 in the extension side flow path 60A of the extension side piston 60 of the damping force generating device 40 through the outer flow path 13C of the cylinder 13 so as to generate the extension side damping force. The oil flowing out of the extension side damping valve 61 to the extension and compression common flow path 46A is mixed with the oil which is replenished from the oil reservoir chamber 32, and thereafter flows out to the piston side oil chamber 27A through the extension side check valve 62 in the extension side flow path 50B of the compression side piston 50. The oil replenished from the oil reservoir chamber 32 compensates the oil at the backward moving volumetric capacity of the piston rod 14.

Therefore, in accordance with the present embodiment, the following operation and effect can be achieved.

(a) In the hydraulic shock absorber 10, the damping force generating device 40 is provided between the piston side oil chamber 27A of the cylinder 13, and the rod side oil chamber 27B, the damping force generating device 40 is provided with the compression side flow paths (the extension and compression common flow paths 46A and 46B, and the compression side flow paths 50A and 60B) which circulate the oil in the piston side oil chamber 27A of the cylinder 13 toward the rod side oil chamber 27B from the outer flow path 13C of the cylinder 13 in the compression side stroke, the compression side damping valve 51 is provided in the upstream side of the compression side flow paths (the extension and compression common flow paths 46A and 46B, and the compression side flow paths 50A and 60B), the compression side check valve 52 is provided in the downstream side thereof, the intermediate portion of the compression side damping valve 51 and the compression side check valve 52 in the compression side flow paths (the extension and compression common flow paths 46A and 46B, and the compression side flow paths 50A and 60B) is communicated with the oil reservoir chamber 32, the damping fore generating device 40 is provided with the extension side flow paths (the extension and compression common flow paths 46A and 46B, and the extension side flow paths 50B and 60A) which circulate the oil in the rod side oil chamber 27B of the cylinder 13 toward the piston side oil chamber 27A from the outer flow path 13C of the cylinder 13 in the extension side stroke, the extension side damping valve 61 is provided in the upstream side of the extension side flow paths (the extension and compression common flow paths 46A and 46B, and the extension side flow paths 50B and 60A), the extension side check valve 62 is provided in the downstream side, and the intermediate portion of the extension side damping valve 61 and the extension side check valve 62 in the extension side flow paths (the extension and compression common flow paths 46A and 46B, and the extension side flow paths 50B and 60A) is communicated with the oil reservoir chamber 32.

In the compression side stroke, the boosted oil in the piston side oil chamber 27A passes through the compression side damping valve 51 in the upstream side of the compression side flow paths (the extension and compression common flow paths 46A and 46B, and the compression side flow paths 50A and 60B) of the damping force generating device 40 so as to generate the compression side damping force. The flow of the one oil in the oil flowing out of the compression side damping valve 51 flows into the rod side oil chamber 27B from the compression side check valve 52 through the outer flow path 13C of the cylinder 13. Further, the flow of the oil at the forward moving volumetric capacity of the piston rod 14 which corresponds to the another flow of the oil in the oil flowing out of the compression side damping valve 51 flows into the oil reservoir chamber 32. At this time, the pressure in the rod side oil chamber 27B approximately depends only on the pressure of the air chamber 31 (since the flow path resistance between the compression side check valve 52 in the downstream side of the compression side damping valve 51 and the outer flow path 13C of the cylinder 13 is small), and does not fluctuate by the setting of the flow path resistance of the compression side damping valve 51. Accordingly, it is possible to avoid a pause of the damping force at a time of the extension side reverse.

In the extension side stroke, the boosted oil in the rod side oil chamber 27B passes through the extension side damping valve 61 in the upstream side of the extension side flow paths (the extension and compression common flow paths 46A and 46B, and the extension side flow paths 50B and 60A) of the damping force generating device 40 from the outer flow path 13C of the cylinder 13 so as to generate the extension side damping force. The oil flowing out of the extension side damping valve 61 is mixed with the oil at the backward moving volumetric capacity of the piston rod 14 which is replenished from the oil reservoir chamber 32, and thereafter flows into the piston side oil chamber 27A through the extension side check valve 62.

In this case, it is possible to set the pressure in the rod side oil chamber 27B to the great positive pressure in the compression side stroke so as to improve a damping response at a time of the extension side reverse, by setting the pressure in the air chamber 31 pressurizing the oil reservoir chamber 32 to the high pressure.

(b) The damping force generating device 40 in the item (a) mentioned above has the valve piece 41 which is immobilized to the cylinder 13 provided in the damper case 11, the center plate 45 is provided in the outer periphery of the valve piece at the center along the axial direction of the valve piece 41, the compression side damping valve 51 and the extension side check valve 62 are provided on the one side in the axial direction pinching the center plate 45 in the outer periphery of the valve piece 41, the extension side damping valve 61 and the compression side check valve 52 are provided in the another side, and the set of the compression side damping valve 51 and the extension side check valve 62 and the set of the extension side damping valve 61 and the compression side check valve 52 are arranged so as to be line symmetrical across the center plate 45. In accordance with this, it is possible to set both the flow path of the oil in the item (a) mentioned above which flows out of the rod side oil chamber 27B and the oil reservoir chamber 32 from the piston side oil chamber 27A through the damping force generating device 40 in the compression side stroke, and the flow path of the oil in the item (a) mentioned above which flows out to the piston side oil chamber 27A from the rod side oil chamber 27B and the oil reservoir chamber 32 through the damping force generating device 40 in the extension side stroke to the short flow path lengths and the small flow path resistances, and it is possible to make the oil flows smooth.

(c) The damping force generating device 40 in the item (b) mentioned above is structured such that the valve piece 41 is immobilized onto the center axis of the cylinder 13 in one end side within the piston side oil chamber 27A of the cylinder 13, the extension and compression common flow path 46A is provided in the periphery of the center plate 45, and the extension and compression common flow path 46A is communicated with the oil reservoir chamber 32 via the extension and compression common flow path 48A which is provided in the center plate 45 and the extension and compression flow path 48B which is provided in the valve piece 41. In accordance with this, it is possible to make the route which communicates the extension and compression common flow path 46A of the damping force generating device 40 with the oil reservoir chamber 32 compact so as to make the flow of the oil in the route smooth.

In this case, the damping force generating device 40 may be accessorily provided with the compression side damping force generating means in the compression side check valve 52 provided in the downstream side of the compression side flow paths (the extension and compression common flow paths 46A and 46B, and the compression side flow paths 50A and 60B). The compression side damping force generating means may be constructed by forming the compression side check valve 52 as a laminated disc valve, and/or forming the compression side flow path 60B provided with the compression side check valve 52 as a throttling flow path, or the like.

In accordance with this, in the compression side stroke, the flow of one oil in the oil flowing out of the compression side damping valve 51 in the upstream side flows into the rod side oil chamber 27B from the compression side check valve 52 through the outer flow path 13C of the cylinder 13; however, the compression side check valve 52 achieves the compression side damping force generating function as well as the check function. The compression side check valve 52 generates a damping force ΔF which depends on the piston speed, and a pressure Pr in the rod side oil chamber 27B comes to a value obtained by subtracting ΔF from a pressure Pa in the air chamber 31 pressurizing the oil reservoir chamber 32, that is, a value which is controlled depending on the piston speed.

The pressure Pr of the rod side oil chamber 27B being controlled depending on the piston speed in the compression side stroke as mentioned above means that it is possible to control a rising characteristic of the damping force at a time of the extension side reverse depending on the piston speed. When the piston speed is high, ΔF becomes larger by a throttling of the compression side check valve 52, and Pr becomes smaller. Accordingly, the rising edge of the damping force at a time of the extension side reverse becomes slow so as to improve a ride quality. When the piston speed is low, ΔF by the throttling of the compression side check valve 52 becomes smaller, and Pr becomes larger. Accordingly, the rising edge of the damping force at a time of the extension side reverse becomes sharp so as to suppress a wobbling feeling of the vehicle body and improve a driving stability.

At this time, a total amount of the compression side damping force comes to a summation of the damping force of the compression side damping valve 51 and the damping force of the compression side check valve 52; however, the damping force of the compression side damping valve 51 is made larger in a normal setting. The total amount of the compression side damping force approximately depends on the damping force of the compression side damping valve 51.

Further, the damping force generating device 40 may be accessorily provided with the extension side damping force generating means in the extension side check valve 62 provided in the downstream side of the extension side flow paths (the extension and compression common flow paths 46A and 46B, and the extension side flow paths 50B and 60A). The extension side damping force generating means may be constructed by forming the extension side check valve 62 as a laminated disc valve, and/or forming the extension side flow path 50B provided with the extension side check valve 62 as a throttling flow path, or the like.

In accordance with this, in the extension side stroke, the flow of the one oil in the oil flowing out of the extension side damping valve 61 in the upstream side flows into the piston side oil chamber 27A from the extension side check valve 62 through the outer flow path 13C of the cylinder 13; however, the extension side check valve 62 achieves the extension side damping force generating function as well as the check function. The extension side check valve 62 generates the damping force ΔF which depends on the piston speed, and a pressure Pp in the piston side oil chamber 27A comes to a value obtained by subtracting ΔF from the pressure Pa in the air chamber 31 pressurizing the oil reservoir chamber 32, that is, a value which is controlled depending on the piston speed.

The pressure Pp of the piston side oil chamber 27A being controlled depending on the piston speed in the extension side stroke as mentioned above means that it is possible to control a rising characteristic of the damping force at a time of the compression side reverse depending on the piston speed. When the piston speed is high, ΔF becomes larger by a throttling of the extension side check valve 62, and Pp becomes smaller. Accordingly, the rising edge of the damping force at a time of the compression side reverse becomes slow so as to improve a ride quality. When the piston speed is low, ΔF by the throttling of the extension side check valve 62 becomes smaller, and Pp becomes larger. Accordingly, the rising edge of the damping force at a time of the compression side reverse becomes sharp so as to suppress a wobbling feeling of the vehicle body and improve a driving stability.

At this time, a total amount of the extension side damping force comes to a summation of the damping force of the extension side damping valve 61 and the damping force of the extension side check valve 62; however, the damping force of the extension side damping valve 61 is made larger in a normal setting. The total amount of the extension side damping force approximately depends on the damping force of the extension side damping valve 61.

Further, the damping force generating device 40 may be provided in the valve piece 41 with a bypass flow path which communicates the piston side oil chamber 27A of the cylinder 13 with the rod side oil chamber 27B and the oil reservoir chamber 32 while bypassing the compression side damping valve 51 and the extension side damping valve 61, and a damping force regulating valve which is operated from the outside may be provided in this bypass flow path. In accordance with this, it is possible to regulate a magnitude of the compression side damping force and the extension side damping force by using the damping force generating device 40.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

INDUSTRIAL APPLICABILITY

The present invention relate to a hydraulic shock absorber comprising: an oil chamber of a cylinder provided in a damper case which is attached to one of a vehicle body side and an axle side; a piston rod attached to another of the vehicle body side and the axle side, the piston rod being inserted into the oil chamber; a piston provided in a leading end portion of the piston rod, the oil chamber of the cylinder being divided into a piston side oil chamber and a rod side oil chamber by the piston; an oil reservoir chamber compensating a volumetric capacity of the piston rod which goes into and out of the oil chamber of the cylinder, the oil reservoir chamber being communicated with the oil chamber of the cylinder; and a damping force generating device provided between the piston side oil chamber and the rod side oil chamber of the cylinder. An outer flow path communicating between the piston side oil chamber and the rod side oil chamber is provided around the oil chamber of the cylinder in the damper case, and the oil reservoir chamber is provided around the oil chamber of the cylinder in the damper case and the outer flow path. Accordingly, it is possible to additionally provide an oil chamber of a cylinder, an outer flow path and an oil reservoir chamber in an inner portion of a damper case having a short entire length, in a hydraulic shock absorber.

EXPLANATIONS OF LETTERS OR NUMERALS 10 hydraulic shock absorber
11 damper case
12 damper tube
13 damper cylinder
13A outer tube
13B inner tube
14 piston rod
25 piston
27 oil chamber
27A piston side oil chamber
27B rod side oil chamber
31 air chamber
32 oil reservoir chamber
40 damping force generating device
41 valve piece
45 center plate
50A compression side flow path
50B extension side flow path
51 compression side damping valve
52 compression side check valve
60 extension side piston
60A extension side flow path
60B compression side flow path
61 extension side damping valve
62 extension side check valve

The invention claimed is:

1. A hydraulic shock absorber comprising:
an oil chamber of a cylinder provided in a damper case which is attached to one of a vehicle body side and an axle side;
a piston rod attached to another of the vehicle body side and the axle side, the piston rod being inserted into the oil chamber;
a piston provided in a leading end portion of the piston rod, the oil chamber of the cylinder being divided into a piston side oil chamber and a rod side oil chamber by the piston;
an oil reservoir chamber compensating a volumetric capacity of the piston rod which goes into and out of the oil chamber of the cylinder, the oil reservoir chamber being communicated with the oil chamber of the cylinder; and
a damping force generating device provided between the piston side oil chamber and the rod side oil chamber of the cylinder,
wherein an outer flow path communicating between the piston side oil chamber and the rod side oil chamber is provided around the oil chamber of the cylinder in the damper case, and communication between the piston side oil chamber and the rod side oil chamber is established by the outer flow path in both of a compression side stroke and an extension side stroke,
the oil reservoir chamber is provided around the oil chamber and the outer flow path of the cylinder in the damper case, and
wherein the damping force generating device has a single valve unit, and is provided with a compression side flow path, provided in the valve unit, which circulates the oil in the piston side oil chamber of the cylinder toward the rod side oil chamber via the outer flow path of the cylinder in said compression side stroke, the compression side flow path is provided with a compression side damping valve in its upstream side and with a compression side check valve in its downstream side, the compression side damping valve and the compression side check valve in the compression side flow path are communicated with the oil reservoir chamber, and
the damping force generating device is provided with an extension side flow path, provided in the valve unit, which circulates the oil in the rod side oil chamber of the cylinder toward the piston side oil chamber via the outer flow path of the cylinder in said extension side stroke, the extension side flow path is provided with an extension side damping valve in its upstream side and with an extension side check valve in its downstream side, the extension side damping valve and the extension side check valve in the extension side flow path are communicated with the oil reservoir chamber wherein the valve unit of the damping force generating device has a valve piece which is immobilized to the cylinder,
two opposed center plates are provided in an outer periphery of the valve piece at the center along an axial direction of the valve piece, both of said center plates being non-moveable with respect to the piston rod, and
the compression side damping valve and the extension side check valve are provided on one side of the valve piece in the axial direction pinching the center plates in the outer periphery of the valve piece, the extension side damping valve and the compression side check valve are provided on another side of the valve piece, and a set of the compression side damping valve and the extension side check valve and a set of the extension side damping valve and the compression side check valve are arranged so as to be line symmetrical across the center plates.

2. The hydraulic shock absorber according to claim 1, wherein in the damper case the cylinder is inserted and fitted into an inner portion of a damper tube, the cylinder consists of an outer tube and an inner tube, the oil chamber is formed in an inner portion of the inner tube, the outer flow path is formed between the outer tube and the inner tube, and the oil reservoir chamber is formed between the damper tube and the outer tube.

3. The hydraulic shock absorber according to claim 1, wherein the damping force generating device is accessorily provided with a compression side damping force generating means in the compression side check valve provided in the downstream side of the compression side flow path.

4. The hydraulic shock absorber according to claim 1, wherein the damping force generating device is accessorily provided with an extension side damping force generating means in the extension side check valve provided in the downstream side of the extension side flow path.

5. The hydraulic shock absorber according to claim 1, wherein the damping force generating device is structured such that the valve piece is immobilized at a center axis of the cylinder in one end side within the piston side oil chamber of the cylinder, and
the compression side flow path and the extension side flow path are provided in the periphery of the center plate, and the compression side flow path and the extension side flow path are communicated with the oil reservoir chamber via a communication path which is provided in the center plates and a communication path which is provided in the valve piece.

6. The hydraulic shock absorber according to claim 1, wherein the damping force generating device is structured such that a hollow portion provided along the center axis of the valve piece is provided with a bypass flow path which communicates the piston side oil chamber of the cylinder with the rod side oil chamber and the oil reservoir chamber while bypassing the compression side damping valve and the extension side damping valve, and a damping force regulating valve which is operated from the outside is provided in this bypass flow path.

7. The hydraulic shock absorber according to claim 2, wherein the damper case is formed as a triple tube in which the damper tube, and the outer tube and the inner tube of the cylinder are coaxially arranged.

8. The hydraulic shock absorber according to claim 2, wherein the damping force generating device is accessorily provided with a compression side damping force generating means in the compression side check valve provided in the downstream side of the compression side flow path.

9. The hydraulic shock absorber according to claim 2, wherein the damping force generating device is accessorily provided with an extension side damping force generating means in the extension side check valve provided in the downstream side of the extension side flow path.

10. The hydraulic shock absorber according to claim 3, wherein the damping force generating device is accessorily provided with an extension side damping force generating means in the extension side check valve provided in the downstream side of the extension side flow path.

11. The hydraulic shock absorber according to claim 5, wherein the damping force generating device is structured such that a hollow portion provided along the center axis of the valve piece is provided with a bypass flow path which communicates the piston side oil chamber of the cylinder with the rod side oil chamber and the oil reservoir chamber while bypassing the compression side damping valve and the extension side damping valve, and a damping force regulating valve which is operated from the outside is provided in this bypass flow path.

* * * * *